United States Patent [19]

Nielsen

[11] Patent Number: 5,080,319

[45] Date of Patent: Jan. 14, 1992

[54] ADJUSTABLE POSITION MOUNTING DEVICE AND METHOD

[75] Inventor: Christian A. Nielsen, Madison, Wis.

[73] Assignee: Erka Corporation, Madison, Wis.

[21] Appl. No.: 586,831

[22] Filed: Sep. 24, 1990

[51] Int. Cl.⁵ ........................................... F16M 11/00
[52] U.S. Cl. ................................ 248/669; 248/188.2
[58] Field of Search ............... 248/669, 188.2, 188.4, 248/637, 649, 650

[56] References Cited

U.S. PATENT DOCUMENTS

| | | |
|---|---|---|
| 972,287 | 10/1910 | Swift . |
| 1,373,708 | 4/1921 | Blume . |
| 2,476,381 | 7/1949 | Peavey ............................. 248/188.4 |
| 3,175,795 | 3/1965 | Adams ............................. 248/188.4 |
| 4,331,314 | 5/1982 | Chacour et al. . |
| 4,632,356 | 12/1986 | Munz . |
| 4,798,359 | 1/1989 | Ball ................................. 248/649 X |
| 4,991,805 | 2/1991 | Solak et al. ...................... 248/188.4 |

FOREIGN PATENT DOCUMENTS 0385184  12/1922  United Kingdom ................ 248/669

Primary Examiner—Ramon O. Ramirez
Attorney, Agent, or Firm—Andrus, Sceales, Starke & Sawall

[57] ABSTRACT

A mounting device and method for providing vertical adjustment of one member relative to another, for use in an installation in which vertical alignment between adjacent pieces of equipment is desired. A base is adapted for mounting to a supporting surface, and a threaded member extends from the base. A support member in the form of a nut is engageable with the threaded member, and supports a piece of equipment above the supporting suface. A locking ring is interposed between the base and the support member for selectively interconnecting the support member with the base to prevent relative rotation therebetween. In this manner, the vertical position of the support member above the base is fixed, as is the vertical position of the equipment relative to the supporting surface. The ring includes a plurality of spaced tabs which are bendable into engagement with one or more slots formed in the support member to prevent rotation of the support member and to fix the vertical position of the equipment.

12 Claims, 1 Drawing Sheet

ADJUSTABLE POSITION MOUNTING DEVICE AND METHOD

REFERENCE TO DISCLOSURE DOCUMENT

This invention is the subject of a Disclosure Document number 183,722, stamped as received in the Patent and Trademark Office on Jan. 4, 1988.

BACKGROUND OF THE INVENTION

This invention relates to a device for placement between an object and a supporting surface to which the object is mounted, and more particularly to such a device which provides adjustment of the position of the object relative to the supporting surface.

In machinery installations, it is common to provide a power source which drives a driven machine. For example, a motor or engine is often mounted adjacent a piece of equipment, such as a pump, gear reducer or the like adapted to be driven thereby. The motor and the driven device are often mounted to the same supporting surface. In most cases, the height between the motor output shaft and motor mounting structure is different than the height between the input shaft of the driven device and its mounting structure. This difference in height is customarily accommodated by placing steel shims between the supporting surface and the motor and/or the driven device to align the motor output shaft and the input shaft of the driven device. This procedure entails several drawbacks. For one, it is often necessary to grind shims to provide a non-standard thickness in order to accurately align the motor output shaft and the driven device input shaft. In addition, events can occur over time which upset the alignment between the respective shafts. For example, a foundation may settle or the supporting surface may become distorted, resulting in misalignment of the shafts. When this occurs, adjustments must be made in the height of the shims beneath the motor and/or the driven device, to re-align their output and input shafts, respectively.

SUMMARY OF THE INVENTION

It is an object of the present invention to provide a mounting device and method which eliminates installation of shims between adjacent pieces of equipment, and in which the relative vertical position of one or both of the pieces of equipment is variable to attain a desired vertical position of one piece of equipment relative to the other. It is a further object of the invention to provide a simple mounting device and method for a piece of equipment which is easy to install and which provides adjustment of the position of one piece of equipment relative to the other even after initial installation.

In accordance with one aspect of the invention, a device for adjusting the position of an object relative to a supporting surface includes a base adapted for placement on the supporting surface, a support member adapted for placement adjacent the object, and threaded vertical positioning means interposed between the base and the support member for adjusting the position of the support member relative to the base, and thereby the position of the object relative to the supporting surface upon relative rotation between the support member and base. Locking means is provided for selectively preventing relative rotation between the base and the support member, to selectively fix the vertical position of the object relative to the supporting surface. The threaded vertical positioning means preferably comprises an upstanding externally threaded member connected to the base. The support member preferably comprises an internally threaded nut engageable with the external threads on the upstanding threaded member, and rotatable thereon to adjust the vertical position of the object relative to the supporting surface. In a preferred embodiment, the locking means comprises a ring encircling the upstanding threaded member. The ring is interconnected with the base so as to be non-rotatable relative to the base. In one embodiment, this is achieved by providing a depending tab on the ring which is received within a slot formed in the base, with engagement of the tab in the slot preventing rotation of the ring. The ring further includes a series of radially spaced, upwardly extending tabs, and the nut is provided with slots on its outer surface, spaced at equal intervals around the outer circumference of the nut. When the desired position of the nut on the threaded member is attained, one or more of the upwardly extending tabs on the ring are movable into one or more of the slots formed in the nut to prevent rotation of the nut on the threaded member. In this manner, the position of the object relative to the supporting surface is fixed. If it is thereafter desired to adjust the position of the object, the tabs are bent out of the slots and the nut repositioned on the threaded member. Once the appropriate position is attained, one or more of the tabs are again bent into one or more slots to fix the position of the nut on the threaded member.

The invention further contemplates a method of adjusting the spacing between a first member and second member. In accordance with the method, a threaded assembly is positioned between the first and second members, with the assembly including a base engageable with one of the members and a support member engageable with the other of the members. Relative rotation between the base and the support member adjusts the spacing between the first and second members. By interconnecting the base with the support member when a desired predetermined spacing is attained, relative rotation between the base and the support member is prevented to maintain a desired spacing between the first and second members.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
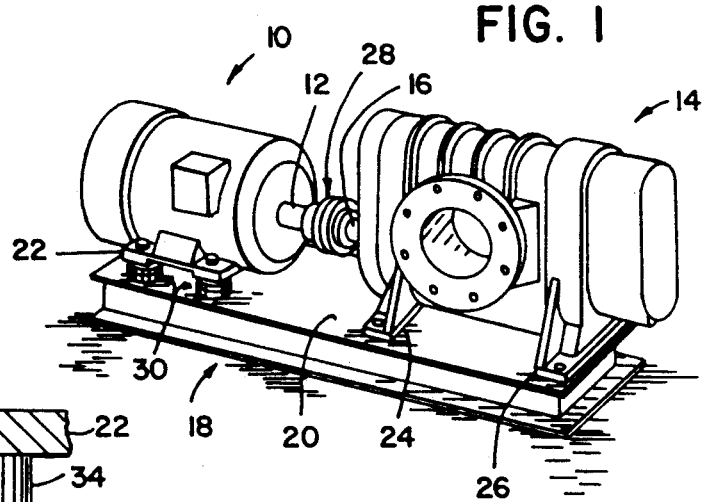
FIG. 1 is a perspective view illustrating a motor and a driven device mounted to a supporting surface, with a series of mounting devices constructed according to the invention disposed between the base of the motor and the supporting surface.

FIG. 1 illustrates a motor 10 having an output shaft 12 and a pump 14 having an input shaft 16 adapted to be coupled to motor output shaft 12. Both motor 10 and pump 14 are mounted to a support pad, shown generally at 18, having an upper plate 20 supporting the motor and the pump. Motor 10 is provided with a lower mounting plate 22, and pump likewise includes a pair of spaced lower mounting members 24, 26.

In a manner as is known, motor output shaft 12 and pump input shaft 16 are coupled together through a coupling 28 so that pump 14 is driven in response to operation of motor 10. While a motor and pump arrangement is illustrated in FIG. 1, it is to be understood that the invention is usable in connection with any two adjacent pieces of equipment in which vertical alignment between the pieces of equipment is desired.

A series of mounting devices constructed according to the invention, shown generally at 30, are placed between the lower surface of motor mounting plate 22 and the upper surface of support plate 20. Each of mounting devices 30 are identical in construction and operation, and provide a means for adjusting the vertical position of motor 10 relative to pump 14 to attain accurate alignment of motor output shaft 12 with pump input shaft 16.

Figure 2:
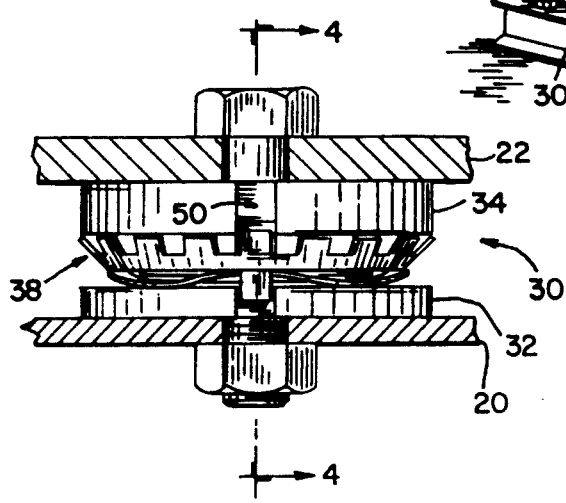
FIG. 2 is a partial sectional view showing one of the mounting devices constructed according to the invention as positioned between the base of the motor and the supporting surface.
Figure 4:
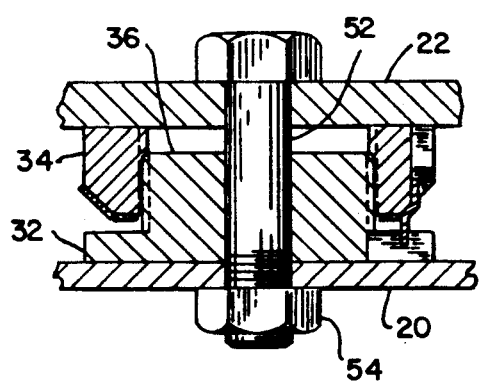
FIG. 4 is a view similar to FIG. 2, showing the mounting device of the invention in section.
Figure 3:
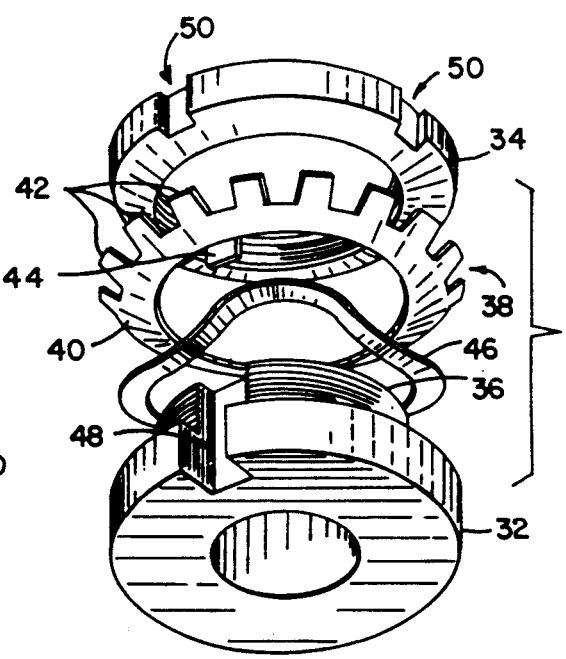
FIG. 3 is an exploded perspective view showing the individual components of a mounting device constructed according to the invention.

FIG. 2 illustrates a mounting device 30 in detail. As shown, mounting device 30 includes a base member 32 adapted for placement on the upper surface of support plate 20, and a support member 34 on which the lower surface of motor mounting plate 22 rests. As shown in FIGS. 2-4, an externally threaded member 36 extends upwardly from base 32, and support member 34 comprises an internally threaded nut threadedly engaged with threaded member 36. Rotation of nut 34 on threaded member 36 results in an adjustment in the space between support plate 20 and mounting plate 22, and thereby the vertical position of motor output shaft 12 relative to support plate 20. Adjusting each of the mounting devices 30 below motor mounting plate 22 results in accurate alignment of motor output shaft 12 relative to pump input shaft 16.

A locking ring 38 encircles threaded member 36 between the lower surface of support member 34 and the upper surface of base 32. Locking ring 38 generally comprises a circular ring body 40 having a large number of radially spaced tabs 42 extending upwardly and outwardly from the ring body at equal intervals about its outer periphery. In addition, a tab 44 extends downwardly from the inner edge of ring body 40. A spring 46 is located below locking ring 38 and the upper surface of base 32, for urging locking ring 38 upwardly against the lower surface of support member 34. The spring 46 may be in the form of a spring washer as illustrated in FIG. 3 or alternatively one or more helical springs known to the art.

Base 32 and threaded member 36 are provided with a single vertical slot 48 extending continuously throughout the height of base 32 and threaded member 36. Depending tab provided on locking ring 38 is engageable within slot 48 formed in base 32 and upstanding threaded member 36. Tab 44 has a width machined in close tolerance to the width of slot 48, so that after tab 36 is engaged within slot 48, locking ring 38 is prevented from rotating relative to base 32.

Support member 34 is provided with a series of equally spaced vertical slots 50 in its outer surface. In the embodiment illustrated, four equally spaced slots 50 are provided on support member.

After support member 34 is rotated on threaded member 36 to attain the desired position of motor 10 relative to support plate 20, the upstanding tab 42 which is aligned with one of the slots 50 formed in support member 34 is bent into the slot. Upstanding tabs 42 are machined to provide a width substantially equal to the width of slots 50 in support member 34, and engagement of one of tabs 42 within one of slots 50 prevents relative rotation between support member 34 and base 32.

Spring 46 acts to urge locking ring 38 against support member 34, to prevent any cocking or tilting of locking ring 38. Alternatively, locking ring 38 could be tack-welded to the upper surface of base 32 and spring 46 eliminated, which would achieve the same goal.

When it is desired to readjust the position of motor 10 on support pad 18 for whatever reason, this is accomplished by bending the tab 42 engaged with one of the slots 50 in support member 34 out of the slot 50, thereby once again allowing rotation of support member on threaded member. After the new desired position of motor 10 is attained, the tab 42 which lines up with one of the slots 50 in support member 34 is bent into the slot 50 to once again prevent rotation of support member 34 on upstanding member 36, thereby fixing the vertical position of motor 10.

Throughout the range of adjustment of support member 34 on threaded member 36, tab 44 remains engaged within slot 48 to prevent rotation of locking ring 38 relative to base 32.

Threaded member 36 and base 32 include a substantially central passage adapted to receive a bolt 52 extending between motor mounting plate 22 and support plate 20, with a nut 54 being threadedly engaged with bolt 52. With this arrangement, motor mounting plate 22 is securely connected to support pad 18 with mounting device 30 sandwiched therebetween. Nut 54 is loosened when it is desired to adjust mounting device 30, after which nut 54 is again turned down.

Locking ring 38 is provided with an uneven number of tabs 42, and support member 34 is provided with an even number of slots 50. With this arrangement, it is always assured that one of the tabs 42 on locking ring 38 lines up with a slot 50 on support member 34, for allowing incremental adjustments of the vertical position of motor 10 on support pad 18. This feature is important when rotation of a slot on support member 34 from one tab 42 to its adjacent tab is too much adjustment.

It is desirable to ensure that a certain amount of minimum engagement of support member 34 on threaded member 36 is always maintained, in order to ensure stability of mounting device 30.

Various alternatives and embodiments are contemplated as being with the scope of the following claims particularly pointing out and distinctly claiming the subject matter regarded as the invention.

I claim:

1. A device for adjusting the vertical position of an object relative to a supporting surface, comprising:
   a base adapted for placement on the supporting surface;
   a support member adapted for placement adjacent the object;
   threaded vertical positioning means interposed between the base and the support member for providing adjustment of the vertical position of the support member relative to the base, and thereby adjustment of the position of the object relative to the supporting surface, upon relative rotation between the support member and the base; and locking means interconnected with the base for selectively preventing relative rotation between the base and the support member to selectively fix the vertical position of the object relative to the supporting surface.

2. The device of claim 1, wherein the threaded vertical positioning means comprises a threaded member extending upwardly from the base, and wherein the support member comprises a nut engageable with the threaded member.

3. The device of claim 2, wherein the locking means comprises means for interconnecting the support member with the base for preventing relative rotation therebetween.

4. The device of claim 3, wherein the interconnecting means comprises a locking ring non-rotatably connected to the base.

5. The device of claim 4, wherein the locking ring is non-rotatably connected to the base by means of a tab formed on the locking ring engaged with a slot formed in the base.

6. The device of claim 4, wherein the locking ring includes a plurality of radially spaced tabs, and wherein the support 3member includes a plurality of radially spaced slots, and wherein one or more of the tabs are movable into engagement with one or more of the slots to fix the position of the support member relative to the base.

7. The device of claim 6, wherein the tabs are movable into and out of engagement with the slots to allow repositioning of the support member relative to the base.

8. A method of adjusting the spacing between a first member and a second member, comprising the steps of:
positioning a threaded assembly between the first and second members, the assembly including a base engageable with one of the members and a support member engageable with the other of the members;
providing relative rotation between the base and the support member to attain a predetermined spacing between the first and second members; and
interconnecting the base with the support member when the predetermined spacing is attained, to prevent relative rotation therebetween and to maintain the predetermined spacing between the first and second members wherein the step of interconnecting the support member with the base comprises positioning a locking means between the support member and the base, wherein the locking means is interconnected with the base and includes means for selectively interconnecting the support member with the base.

9. The method of claim 8, wherein the threaded assembly includes a threaded member connected to the base, and wherein rotation of the support member on the threaded member adjusts the position of the support member relative to the base.

10. The method of claim 8, wherein the locking means is formed with a plurality of radially spaced, bendable tabs, and wherein the support member is formed with a plurality of radially spaced slots, and wherein the step of interconnecting the support member with the base comprises selectively placing one or more of the tabs into one or more of the slots.

11. The method of claim 8, further comprising the step of non-rotatably securing the locking ring to the base.

12. The method of claim 11, wherein the step of non-rotatably securing the locking ring to the base comprises forming a slot in the base and forming a tab on the locking ring engageable with the slot in the base.

* * * * *